(12) United States Patent
Horiuchi et al.

(10) Patent No.: US 8,588,173 B2
(45) Date of Patent: Nov. 19, 2013

(54) FREQUENCY BAND ALLOCATION METHOD AND TRANSMISSION DEVICE

(75) Inventors: Ayako Horiuchi, Kanagawa (JP); Katsuhiko Hiramatsu, Kanagawa (JP); Seigo Nakao, Kanagawa (JP); Yasuaki Yuda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 13/057,254

(22) PCT Filed: Aug. 6, 2009

(86) PCT No.: PCT/JP2009/003778
§ 371 (c)(1),
(2), (4) Date: Feb. 2, 2011

(87) PCT Pub. No.: WO2010/016261
PCT Pub. Date: Feb. 11, 2010

(65) Prior Publication Data
US 2011/0134870 A1 Jun. 9, 2011

(30) Foreign Application Priority Data
Aug. 7, 2008 (JP) .................. 2008-204327

(51) Int. Cl.
H04W 4/00 (2009.01)
H04W 72/04 (2009.01)
H04L 5/00 (2006.01)
(52) U.S. Cl.
CPC ......... *H04W 72/0446* (2013.01); *H04L 5/0007* (2013.01)
USPC ........................................ 370/330; 455/562.1
(58) Field of Classification Search
USPC ................. 370/329, 330; 455/562.1
See application file for complete search history.

(56) References Cited

U.S. PATENT DOCUMENTS

| 5,805,633 A | 9/1998 | Uddenfeldt |
| 2008/0146231 A1* | 6/2008 | Huang et al. ................ 455/436 |

(Continued)

FOREIGN PATENT DOCUMENTS

| EP | 0 975 184 | 1/2000 |
| EP | 2 086 139 | 8/2009 |
| JP | 11-512267 | 10/1999 |
| JP | 2002-521937 | 7/2002 |
| JP | 2006-304312 | 11/2006 |
| WO | 2008/053895 | 5/2008 |

OTHER PUBLICATIONS

International Search Report dated Sep. 15, 2009.

(Continued)

*Primary Examiner* — Pao Sinkantarakorn
*Assistant Examiner* — Richard K Chang
(74) *Attorney, Agent, or Firm* — Dickinson Wright PLLC

(57) ABSTRACT

Disclosed is a frequency band allocation method which reduces PAPR (peak to average power ratio) when performing a single carrier transmission in the uplink line of an LTE+ (LTE Advanced) system in a system using both of an LTE (Long Term Evolution) system and the LTE+ system. In the frequency band allocation method, a UL band for the LTE is arranged adjacently in a lower frequency band than the UL band for the LTE+. With this arrangement, it is possible to prevent division of the band for the LTE+ by the uplink line control channel (such as PUCCH) transmitted by an LTE mobile station and to allocate a wide band continuously with the LTE+ mobile station. Especially when the LTE+ mobile station performs a single carrier transmission with the uplink line, the PAPR can be reduced since it is possible to allocate a band continuous with the single carrier signal.

10 Claims, 9 Drawing Sheets

(56) References Cited

U.S. PATENT DOCUMENTS

2008/0247375 A1* 10/2008 Muharemovic et al. ...... 370/344
2008/0318608 A1* 12/2008 Inoue et al. ................... 455/509
2010/0111209 A1* 5/2010 Frenger ......................... 375/260
2010/0284349 A1* 11/2010 Niemela et al. ............... 370/329
2011/0026626 A1* 2/2011 Sahlin et al. ................... 375/260

OTHER PUBLICATIONS

3GPP TSG RAN WG1#53bis, "Carrier aggregation in Advanced E-UTRA," Huawei, R1-082448, Jun. 30-Jul. 4, 2008, pp. 1-4.
3GPP TSG RAN WG1 Meeting #53, "Proposals for LTE-Advanced Technologies," NTT DoCoMo, R1-081948, May 2008, pp. 1-29. p. 5, Line 6.

* cited by examiner

FREQUENCY BAND ALLOCATION METHOD AND TRANSMISSION DEVICE

TECHNICAL FIELD

The present invention relates to an uplink frequency band allocation method for an LTE (Long Term Evolution) system and an LTE+ (Long Term Evolution Advanced) system in a mixed system, in which an LTE system and LTE+ system coexist, and also relates to a transmitting apparatus to apply to the mixed system.

BACKGROUND ART

In mobile communication, communication is carried out using a downlink (DL) from a radio communication base station apparatus (hereinafter abbreviated as "base station") to a radio communication mobile station apparatus (hereinafter abbreviated as "mobile station") and an uplink (UL) from the mobile station to the base station. Downlink data and a downlink control signal are transmitted on a downlink and uplink data and an uplink control signal are transmitted on an uplink.

The uplink and the downlink are associated with each other, and, when, for example, ARQ (Automatic Repeat Request) is applied to downlink data, the mobile station feeds back a response signal indicating an error detection result of the downlink data to the base station using the uplink. The mobile station carries out a CRC (Cyclic Redundancy Check) check on downlink data and feeds back ACK (Acknowledgment) when CRC=OK (no error) or NACK (Negative Acknowledgment) when CR=NG (with error), to the base station, as a response signal. This response signal is transmitted to the base station using an uplink control channel such as a PUCCH (Physical Uplink Control Channel).

Furthermore, the base station transmits control information for reporting a resource allocation result of the downlink data to the mobile station. The control information is transmitted to the mobile station using a downlink control channel such as a PDCCH (Physical Downlink Control Channel). Each PDCCH occupies one or a plurality of CCEs. When one PDCCH occupies a plurality of CCEs (Control Channel Elements), one PDCCH occupies a series of a plurality of CCEs. The base station allocates one of a plurality of PDCCHs to each mobile station according to the number of CCEs necessary to report control information, maps control information to physical resources corresponding to the CCEs (Control Channel Elements) occupied by each PDCCH, and transmits the physical resources.

Furthermore, a study is underway to associate CCEs with PUCCHs for efficient use of downlink communication resources. Each mobile station can determine a PUCCH to use to transmit a response signal from that mobile station, from the CCE corresponding to the physical resource to which control information directed to that mobile station is mapped.

Since the uplink and downlink are associated with each other in this way, when a plurality of communication systems are preferred to be mixed, allocating an uplink and a downlink to each communication system results in a problem of causing a shortage of frequency resources. Furthermore, when a new communication system is added in a band in which an old communication system is operated, the new communication system is preferably used as is without making any change to the mobile station of the old communication system. Patent Literature 1 proposes a frequency overlay system as a method to solve these problems.

According to Patent Literature 1, when an old communication system and a new communication system are mixed together for the purpose of improving frequency utilization efficiency, the new communication system is designed to cover the frequency of the old communication system, and the new communication system performs scheduling by including the frequency of the old communication system. Furthermore, the accuracy of channel estimation is improved by lowering the correlation between a preamble channel (reference signal) used in the old communication system and a preamble channel (reference signal) used in the new communication system. Furthermore, control channels are provided separately for the new communication system and the old communication system so as to transmit signals in different frequency bands. According to the method disclosed in Patent Literature 1, the uplink and the downlink both operate in the same frequency arrangement in the old communication system and the new communication system.

Furthermore, Non-Patent Literature 1 proposes a frequency arrangement in which an LTE system and an LTE+ system coexist, assuming the old communication system is "LTE" and the new communication system is "LTE+." According to Non-Patent Literature 1, both the uplink and the downlink of the LTE system are arranged in low frequencies. However, in such an arrangement, the center frequency of the downlink of the LTE system is different from the center frequency of the downlink of the LTE+ system. Therefore, for initial synchronization or HO (handover) control, it is necessary to transmit control channels such as an SCH (Synchronous Channel) and BCH (Broadcast Channel) in separate frequencies in both LTE and LTE+.

As a method for solving this problem, there is a method of sharing a center frequency on a downlink, arranging a downlink for LTE in the center and allocating a DL band for LTE+ and a DL band to overlap one another. FIG. 1 shows an arrangement example of a downlink band in this case. FIG. 1 is an example where a DL band for LTE is 10 MHz and a DL band for LTE+ is 40 MHz. As shown in FIG. 1, the DL band for LTE+ is arranged extending to both sides centered on the center frequency of the DL band for LTE. Furthermore, an SCH and BCH of LTE are transmitted using the center frequency of LTE. The SCH is shared between LTE and LTE+. Furthermore, using the differential of the BCH or the like as a BCH+, the BCH+ is transmitted in the DL band for LTE+.

FIG. 1 shows an arrangement of a UL band corresponding to a DL band. As shown in FIG. 1, the center 10 MHz of a UL band is allocated for a UL band for LTE, and 40 MHz, overlapping with the UL band for LTE, is allocated for a UL band for LTE+. Furthermore, a PUCCH and PUCCH+ are arranged at both ends of the uplink of each system. The PUCCH is an uplink control channel for LTE, and the PUCCH+ is an uplink control channel for LTE+. In the LTE system, PUCCHs are arranged within 5 MHz on the left side and right side of the center frequency, while in the LTE+ system, PUCCH+'s are arranged within 20 MHz on the left side and right side of the center frequency.

CITATION LIST

Patent Literature

PTL 1
Japanese Patent Application Laid-Open No.2006-304312

Non-Patent Literature

NPL 1
Proposals for LTE-Advanced Technologies
(http://www.3gpp.org/ftp/tsg_ran/WG1_RL1/TSGR1_53/Docs/R1-081948.z ip)

SUMMARY OF INVENTION

Technical Problem

However, when the uplink is arranged in this way, PUCCHs for LTE are arranged near the center of the uplink, and it is not possible to allocate a band that continues over a 40 MHz range, for LTE+ data transmission. Therefore, when single carrier transmission is applied to the uplink, no continuous band is allocated, which results in a problem of increased PAPR (peak to average power ratio) and reduced power utilization efficiency.

It is therefore an object of the present invention to provide a frequency allocation method and a transmitting apparatus in a mixed system where an LTE system and an LTE+ system coexist, capable of reducing PAPR when single carrier transmission is performed on an uplink of the LTE+ system.

Solution to Problem

In a mixed system in which a first communication system where terminals performing single carrier transmission on an uplink are mixed and a second communication system using an uplink whose maximum bandwidth is narrower than the maximum bandwidth of the uplink of the first communication system coexist, the frequency band allocation method of the present invention allocates a continuous frequency band to the uplink of the first communication system.

In a mixed system in which a first communication system where terminals performing single carrier transmission on an uplink are mixed and a second communication system using an uplink whose maximum bandwidth is narrower than the maximum bandwidth of the uplink of the first communication system coexist, the transmitting apparatus of the present invention adopts a configuration including an acquiring section that acquires information of a continuous frequency band allocated to the uplink of the first communication system and a transmission section that carries out single carrier transmission in a continuous frequency band allocated to the uplink of the first communication system.

Advantageous Effects of Invention

According to the present invention, in a mixed system where an LTE system and an LTE+ system coexist, it is possible to reduce PAPR when single carrier transmission is performed on an uplink of an LTE+ system.

DESCRIPTION OF EMBODIMENTS

Figure 1:
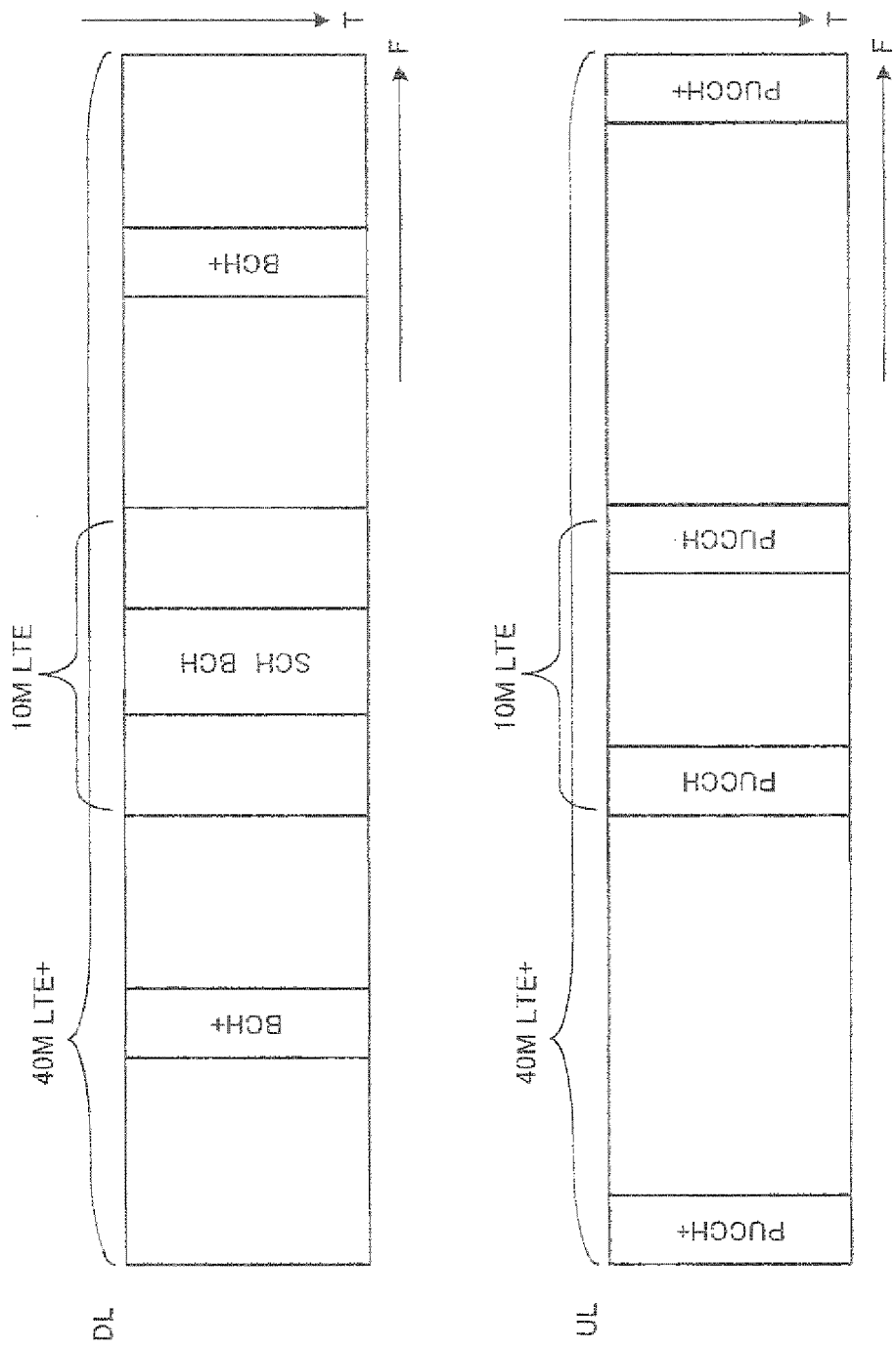
FIG. 1 is a diagram illustrating an arrangement example of DL band and UL band of a mixed system in which an LTE system and an LTE+ system coexist.

Hereinafter, embodiments of the present invention will be described in detail with reference to the accompanying drawings.

Before describing a more specific configuration and operation of embodiments, a communication system assumed in the embodiments will be described first.

(1) The following systems will be assumed as an old communication system and a new communication system.

Old Communication System: LTE (Long Term Evolution)
New Communication System: LTE+ (Also Referred to as "LTE Advanced," "IMT Advanced" or "4G")

(2) The center frequency and frequency band of the LTE system are reported through a BCH (Broadcast Channel). To be more specific, these are reported using SIB (System Information Block) included in a D-BCH (Dynamic-Broadcast Channel).

(3) In the LTE system, bands at both ends of the UL band are used to transmit two PUCCHs (Physical Uplink Control Channels). A PUCCH is a channel to transmit control information such as ACK/NACK information and CQI information and an LTE mobile station apparatus (hereinafter also referred to as "mobile station") transmits a result of CRC check on downlink data (ACK/NACK information or the like) to a base station apparatus (hereinafter referred to as "base station") using the PUCCH. In the LTE system, when the number of PUCCHs increases, PUCCHs are transmitted using bands inside the LTE band sequentially.

The old communication system and the new communication system are not limited to LTE and LTE+ and the present invention is applicable to a mixed system in which a new communication system that carries out single carrier transmission on an uplink and an old communication system that uses an uplink whose maximum bandwidth is narrower than the maximum bandwidth of the uplink of the new communication system coexist. The "maximum bandwidth" refers to a maximum bandwidth of the uplink of the system. For example, the maximum bandwidth of the uplink of the LTE system is 20 MHz and the maximum bandwidth of the uplink of the LTE+ system is 100 MHz. The maximum bandwidth of the uplink in the LTE+ system is not necessarily allocated to the LTE+ base station. The bandwidths operationally allocated are set for each base station from a plurality of candidates equal to or below the maximum bandwidth. Since bandwidths for LTE+ and bandwidths for LTE are set separately, bandwidths allocated for LTE+ may be smaller than the bandwidths allocated for LTE.

Furthermore, since a PUCCH is a control channel to feed back ACK or NACK, the PUCCH may also be called "ACK/NACK channel."

(Embodiment 1)

The present embodiment will describe a mode of operating a mixed system in which an LTE mobile station and an LTE+ mobile station coexist by arranging an uplink band for LTE closer to a lower band and arranging an uplink band for LTE+ closer to a higher band. Adopting such an arrangement prevents uplink control channels (PUCCH or the like) transmitted by the LTE mobile station from dividing a band for LTE+, so that it is possible to allocate wide, continuous band to the LTE+ mobile station. Especially, when the LTE+ mobile station performs single carrier transmission on an uplink, it is possible to allocate a continuous band to a single carrier signal and thereby reduce PAPR (peak to average power ratio).

[Basic Arrangement Example]

Figure 2:
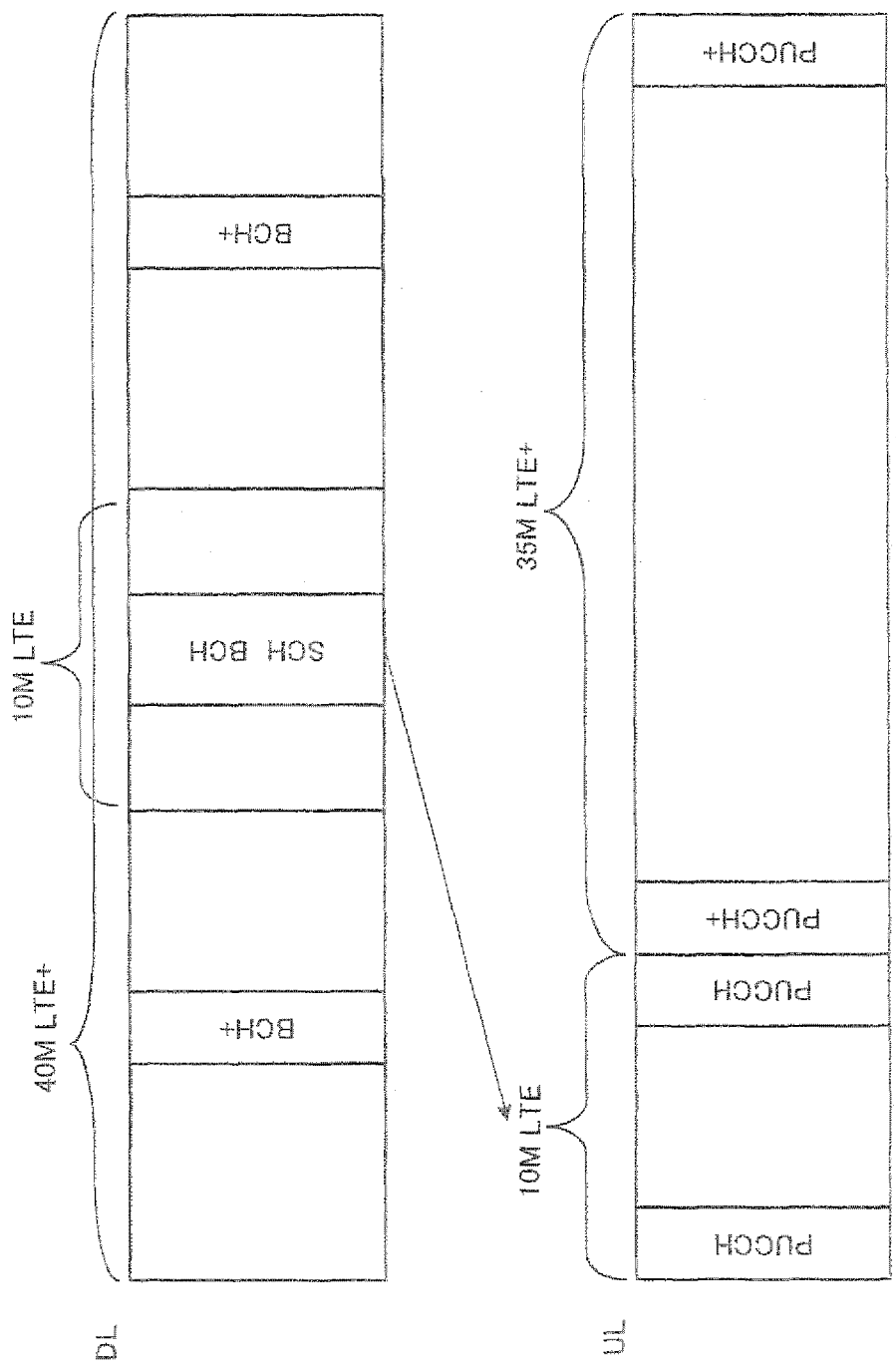
FIG. 2 is a diagram illustrating an arrangement example of DL band and UL band according to Embodiment 1 of the present invention.

FIG. 2 shows an arrangement example of band for LTE and band for LTE+ in the DL band and UL band according to the present embodiment. The "band for LTE" is a band used in an LTE system and the "band for LTE+" is a band used in an LTE+ system.

As shown in FIG. 2, in the DL band, the band for LTE and the band for LTE+ are arranged so that their center frequencies overlap. In the 10 MHz band where the DL band for LTE and the DL band for LTE+ overlap, an LTE system is operated. To be more specific, an SCH (Synchronization Channel) and BCH for LTE are transmitted in the 10 MHz band where the DL band for LTE and the DL band for LTE+ overlap. Using the BCH, the base station reports information about the UL band for LTE to the LTE mobile station and the LTE+ mobile station. Furthermore, BCH+ for LTE+ is transmitted in the DL band for LTE+. The base station reports information about the band for the LTE+ to the LTE+ mobile station using the BCH+.

The LTE mobile station receives the BCH transmitted in the 10 MHz band where the DL band for LTE and the DL band for LTE+ overlap and acquires the position of the UL band for LTE.

The LTE+ mobile station is compatible with the LTE system and is provided with a function similar to the reception function of the LTE mobile station. The LTE+ mobile station receives a signal transmitted in the DL band for LTE from the base station using a reception method similar to that of the LTE mobile station. That is, the LTE+ mobile station receives the BCH transmitted in the 10 MHz band where the DL band for LTE and the DL band for LTE+ overlap and acquires the position of the UL band for LTE as in the case of the LTE mobile station. Furthermore, the LTE+ mobile station receives the BCH+ transmitted in the DL band for LTE+ and acquires the position of the UL band for LTE+ from the information about the UL bandwidth for LTE+ included in the BCH+. The method for acquiring the position of the UL band for LTE+ will be described later.

Thus, by arranging the DL band for LTE and DL band for LTE+ with their center frequencies overlapping each other, it is possible to accommodate the LTE mobile station and the LTE+ mobile station together in the DL band.

On the other hand, as shown in FIG. 2, in the UL band, the band for LTE is arranged in a frequency band lower than the band for LTE+ next to the band for LTE+. PUCCHs are arranged at both ends of the UL band for LTE. It is defined in the LTE system that PUCCHs are arranged at both ends of the UL band for LTE. As the number of PUCCHs increases, PUCCHs are sequentially arranged inside the UL band for LTE. Furthermore, as shown in FIG. 2, in the present embodiment, as in the case of the UL band for LTE, PUCCH+'s are arranged at both ends of the UL band for LTE+.

Thus, in the present embodiment, the UL band for LTE is arranged next to a frequency band lower than the UL band for LTE+. By adopting such an arrangement, it is possible to provide an effect of reducing the amount of signaling of information about the frequency band reported from the base station to the mobile station. The reason will be described below. Prior to the explanation, the method of signaling band information according to the present embodiment will be described first.

As described above, the LTE+ mobile station uses a BCH to acquire information about the UL band for LTE reported from the base station. As the information about the UL band for LTE, the bandwidth Fw[MHz] and center frequency fc[MHz] of the UL band for LTE are reported. The base station selects the bandwidth Fw from among, for example 1.4 MHz, 3 MHz, 5 MHz, 10 MHz, 15 MHz and 20 MHz according to the communication situation of the mobile station or the like.

Furthermore, the base station reports a total bandwidth $Fw_{total}$ of the bandwidth Fw of the UL band for LTE and the bandwidth $Fw_+$ of the UL band for LTE+ using the BCH+. The total bandwidth $Fw_{total}$ is selected from a plurality of candidates, for example, 1.4 MHz, 3 MHz, 5 MHz, 10 MHz, 15 MHz, 20 MHz, 40 MHz, 60 MHz, 80 MHz and 100 MHz.

As described above, the present embodiment arranges the UL band for LTE next to a frequency band lower than the UL band for LTE+. Thus, the LTE+ mobile station can calculate the center frequency $fc_+$ of the UL band for LTE+ using equation 1.

(Equation 1)

$$fc_+ = fc + \frac{Fw}{2} + \frac{Fw_{total} - Fw}{2} = fc + \frac{Fw_{total}}{2} \quad [1]$$

That is, the base station reports the bandwidth Fw and center frequency fc of the UL band for LTE using a BCH, and, therefore, if the base station only needs to report the total bandwidth $Fw_{total}$ using the BCH+, the LTE+ mobile station can acquire the center frequency $fc_+$ of the UL band for LTE+ allocated to the LTE+ mobile station using equation 1 without reporting the center frequency $fc_+$ of the UL band for LTE+.

By this means, the LTE+ mobile station can acquire the center frequency $fc_+$ of the UL band for LTE+ allocated to the LTE+ mobile station by substituting the bandwidth Fw, center frequency fc and total bandwidth $Fw_{total}$ of the UL band for LTE into equation 1, because the UL band for LTE is arranged next to the frequency band lower than the UL band for LTE+.

Therefore, the base station needs only to report the bandwidth Fw, center frequency $fc_+$ and total bandwidth $Fw_{total}$ of the UL band for LTE and need not report the bandwidth $Fw_+$ and center frequency $fc_+$ of the UL band for LTE+, and can thereby reduce the amount of signaling for reporting the information about the UL band for LTE+.

As described above, the present embodiment arranges the UL band for LTE next to the frequency band lower than the UL band for LTE+. Adopting such an arrangement prevents the uplink control channel (PUCCH or the like) transmitted by the LTE mobile station from dividing the band for LTE+, and thereby allows wide bands to be allocated to the LTE+ mobile station continuously. When the LTE+ mobile station performs single carrier transmission on the uplink, this allows continuous bands to be allocated to a single carrier signal and can thereby reduce PAPR (peak to average power ratio). Particularly, since the maximum bandwidth of the uplink of the LTE+ system is wider than the maximum bandwidth (20 MHz) of the uplink of the LTE system, when a bandwidth wider than that for LTE is allocated for LTE+, the present embodiment can secure a wide continuous bandwidth and the effect of reduction of PAPR becomes distinct.

Furthermore, when the base station reports only the bandwidth Fw for LTE, center frequency fc and total bandwidth $Fw_{total}$ of the band for LTE, the LTE+ mobile station can acquire the center frequency $fc_+$ of the UL band for LTE+ allocated to the LTE+ mobile station using equation 1. Thus, the LTE+ mobile station can acquire information about the UL band allocated to the LTE+ mobile station without reporting the center frequency $fc_+$ of the UL band for LTE+ and reduce the amount of signaling for band information reporting.

Furthermore, since the bandwidth $Fw_{total}$ which is a total of the bandwidth of the UL band for LTE and the bandwidth of the UL band for LTE+ is selected from among a plurality of candidates (1.4 MHz, 3 MHz, 5 MHz, 10 MHz, 15 MHz, 20 MHz, 40 MHz, 60 MHz, 80 MHz and 100 MHz), no more than ten patterns of bandwidth need to be prepared in advance. By contrast, when the UL bandwidth for LTE+ is reported, more patterns need to be prepared.

The base station may report the center frequency $fc_+$ of the UL band for LTE+ using a BCH+ instead of the total bandwidth $Fw_{total}$. In this case, the LTE+ mobile station can acquire the total bandwidth $Fw_{total}$ using equation 2.

(Equation 2)
$$Fw_{total} = 2 \times \left(fc_+ - fc - \frac{Fw}{2}\right) \quad [2]$$

Figure 3:
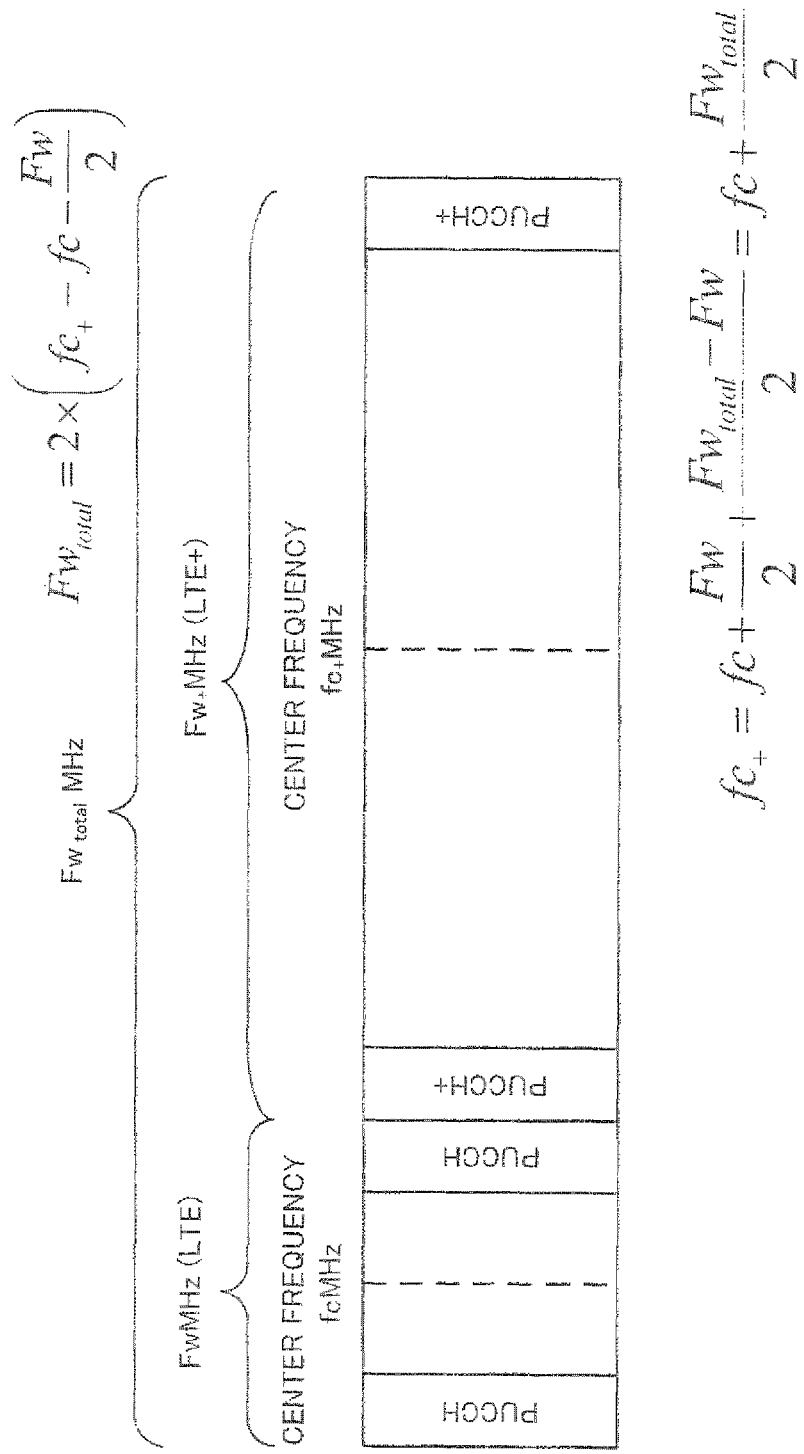
FIG. 3 is a diagram illustrating a relationship between bandwidth Fw and center frequency fc of a UL band for LTE, bandwidth $Fw_+$ and center frequency $fc_+$ of UL band for LTE+ and total bandwidth $Fw_{total}$.

FIG. 3 shows a relationship between the bandwidth Fw and center frequency fc of the UL band for LTE and the bandwidth $Fw_+$ and center frequency $fc_+$ of the UL band for LTE+ and total bandwidth $Fw_{total}$.

[Configuration of Mobile Station Apparatus]

Figure 4:
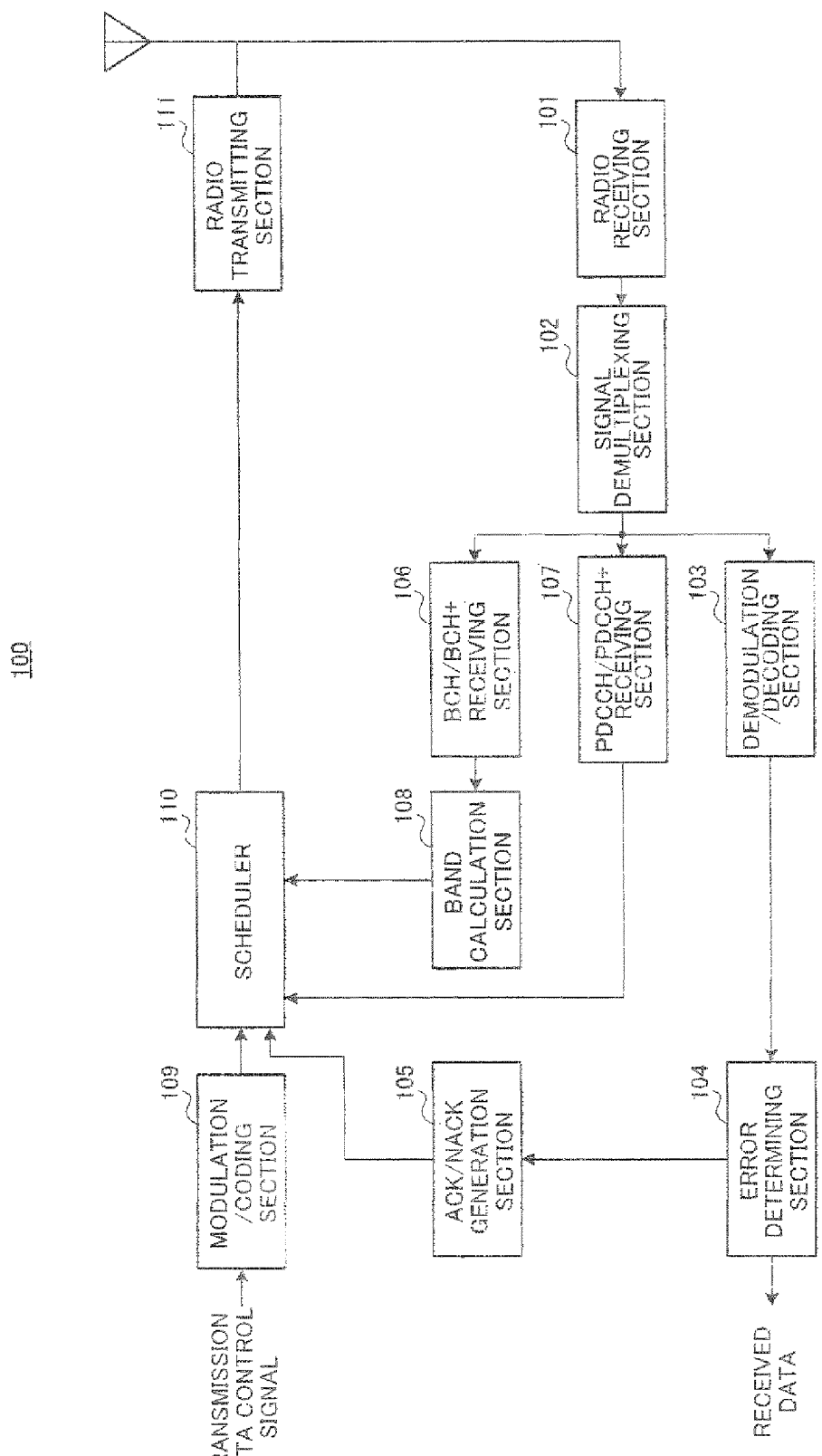
FIG. 4 is a block diagram illustrating a configuration of a mobile station apparatus according to Embodiment 1.

FIG. 4 is a block diagram illustrating a configuration of the mobile station apparatus according to the present embodiment. Mobile station apparatus 100 in FIG. 4 is applicable to both an LTE mobile station and an LTE+ mobile station. Mobile station apparatus 100 in FIG. 4 is comprised of radio receiving section 101, signal demultiplexing section 102, demodulation/decoding section 103, error determining section 104, ACK/NACK generation section 105, BCH/BCH+ receiving section 106, PDCCH (Physical Downlink Control Channel)/PDCCH+ receiving section 107, band calculation section 108, modulation/coding section 109, scheduler 110 and radio transmitting section 111.

Radio receiving section 101 receives a signal transmitted from a base station via an antenna, applies radio processing such as down-conversion and outputs the received signal after the radio processing to signal demultiplexing section 102.

Signal demultiplexing section 102 demultiplexes the received signal into received data, control information such as a BCH and BCH+ and downlink control channel such as a PDCCH and PDCCH. Signal demultiplexing section 102 outputs the received data to demodulation/decoding section 103, outputs control information such as a BCH and BCH+ to BCH/BCH+ receiving section 106 and outputs a downlink control channel such as a PDCCH and PDCCH to PDCCH/PDCCH+ receiving section 107.

Demodulation/decoding section 103 demodulates/decodes the received signal and outputs the demodulated/decoded received data to error determining section 104.

Error determining section 104 determines whether or not the received data contains an error and outputs the determination result to ACK/NACK generation section 105.

ACK/NACK generation section 105 generates ACK when the received data contains no error or generates NACK when the received data contains an error, and outputs the generated ACK/NACK to scheduler 110.

BCH/BCH+ receiving section 106 extracts information about the center frequency fc and bandwidth Fw of the UL band for LTE and, total bandwidth $Fw_{total}$ according to the inputted control information, and outputs the information to band calculation section 108.

PDCCH/PDCCH+ receiving section 107 receives a PDCCH or PDCCH+. PDCCH/PDCCH+ receiving section 107 determines the transmission position of ACK/NACK in a PUCCH associated with the CCE (Control Channel Element) number of the received PDCCH and outputs information about the determined transmission position to scheduler 110. Furthermore, PDCCH/PDCCH+ receiving section 107 determines the transmission position of ACK/NACK in a PUCCH+ associated with the CCE+ number of the received PDCCH+ and outputs information about the determined transmission position to scheduler 110. The association between a PDCCH+ and a PUCCH+ will follow the above described basic arrangement example.

Band calculation section 108 calculates the center frequency $fc_+$ of the UL band for LTE+ and UL bandwidth $Fw_+$ for LTE+ of the UL band for LTE+ using equation 1 and equation 3 and outputs information about the UL bandwidth Fw for LTE, center frequency fc and UL band $Fw_+$ for LTE+ to scheduler 110.

[3]
$$Fw_+ = Fw_{total} - Fw \quad \text{(Equation 3)}$$

Modulation/coding section 109 modulates/encodes a control signal such as transmission data and CQI, acquires a modulated signal and outputs the modulated signal to scheduler 110.

Scheduler 110 schedules the modulated signal to an appropriate frequency band. To be more specific, when using an UL band for LTE, scheduler 110 allocates the modulated signal to an appropriate frequency band of the UL band for LTE using information about the bandwidth Fw and center frequency fc of the UL band for LTE. On the other hand, when using a UL band for LTE+, scheduler 110 allocates the modulated signal in an appropriate frequency band of the UL band for LTE+ using information about the bandwidth $Fw_+$ and center frequency $fc_+$ of the UL band for LTE+.

Furthermore, scheduler 110 stores the association between the PDCCH and PUCCH and the association between the PDCCH+ and PUCCH+ separately. Scheduler 110 then schedules ACK/NACK to data reception in the DL band for LTE to a PUCCH associated with the CCE number of a PDCCH. Furthermore, scheduler 110 schedules ACK/NACK in response to data reception in the DL band for LTE+ to a PUCCH+ associated with the CCE+ number of a PDCCH+.

Scheduler 110 outputs the scheduled modulated signal to radio transmitting section 111.

Radio transmitting section 111 applies single carrier modulation to the scheduled modulated signal and transmits a single carrier signal to the base station via an antenna.

As described above, the present embodiment arranges the UL band for LTE next to a frequency band lower than the UL band for LTE+. When the base station reports only the bandwidth Fw and center frequency fc of the UL band for LTE and total bandwidth $Fw_{total}$, the LTE+ mobile station can acquire the center frequency fc+ of the UL band for LTE+ allocated to the LTE+ mobile station using equation 1. Thus, by reporting only the UL bandwidth Fw for LTE, center frequency fc of the UL band for LTE and total bandwidth $Fw_{total}$ without reporting the center frequency fc+ of the UL band for LTE+, the LTE+ mobile station can acquire information about the UL band allocated to the LTE+ mobile station and can thereby reduce the amount of signaling for band information reporting.

Furthermore, arranging the UL band for LTE in a frequency band lower than the UL band for LTE+ improves channel quality compared to arranging the UL band for LTE in a frequency band higher than the UL band for LTE+ and can secure excellent communication quality even when the LTE mobile station goes away from the base station.

(Embodiment 2)

The present embodiment will describe an arrangement example of a PUCCH+ different from that of Embodiment 1.

In the LTE system, when a PDCCH is transmitted from a base station, an LTE mobile station transmits an ACK/NACK signal corresponding to data reception on a downlink to the base station using a PUCCH corresponding to the CCE number where the PDCCH is arranged. Thus, the LTE system associates the transmission position of a PDCCH with the transmission position of a PUCCH for transmitting ACK/NACK and operates according to the rule of association.

Embodiment 1 has described an example where the rule of association between PDCCH and PUCCH in the LTE system is applied to an LTE+ system. That is, PUCCH+'s are arranged at both ends of the UL band for LTE+.

The present embodiment proposes a new rule of association between PDCCH+ and PUCCH+ and will describe three arrangement examples below. The following explanation will assume that two PUCCH+'s are distinctively referred to as a "first PUCCH+" and a "second PUCCH+" and the first PUCCH+ is arranged on a frequency side lower than the second PUCCH+. Furthermore, a case will be described below where the UL band for LTE is 10 MHz and the UL band for LTE+ is 35 MHz as an example.

ARRANGEMENT EXAMPLE 1

Figure 5:
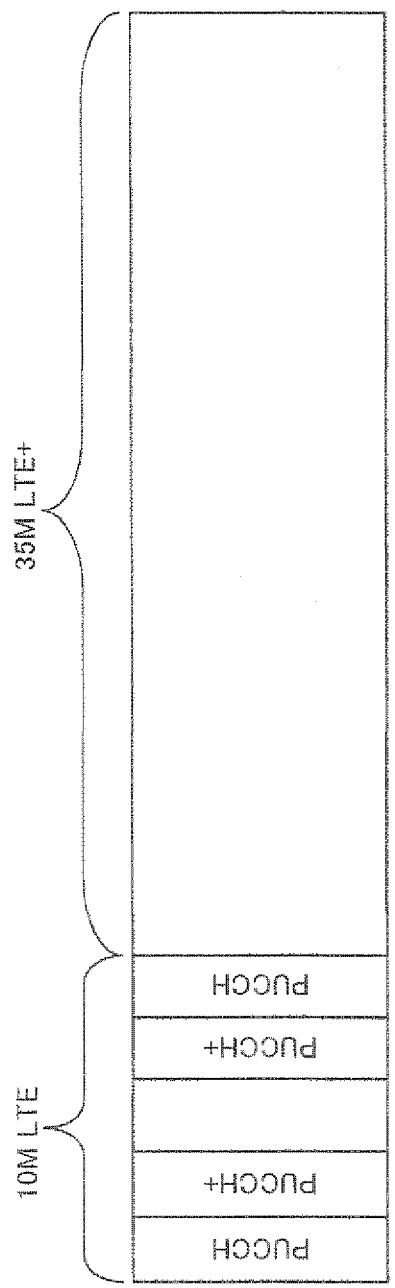
FIG. 5 is a diagram illustrating an arrangement example 1 of DL band and UL band according to Embodiment 2 of the present invention.

FIG. 5 shows arrangement example 1.

In arrangement example 1, the first and second PUCCH+'s for LTE+ are arranged inside PUCCH's for LTE. Thus, by arranging the first and second PUCCH+'s for LTE+ next to PUCCH's for LTE and within the UL band for LTE prevents the first and second PUCCH+'s in the UL band for LTE+ from being transmitted. This makes it possible to increase a bandwidth that can be allocated to LTE+ data transmission and transmit more data.

As described above, PUCCH's transmitted on the downlink for LTE and PUCCH's transmitted on the uplink for LTE are associated with each other and the LTE mobile station transmits ACK/NACK using a PUCCH associated with the CCE number where the PDCCH is arranged.

In arrangement example 1, since the first PUCCH+ is arranged on the lower frequency side of the UL band for LTE and the second PUCCH+ is arranged on the higher frequency side of the UL band for LTE, a frequency diversity effect similar to that of Embodiment 1 is obtained. Furthermore, since the first and second PUCCH's are arranged on the lower frequency side of the UL band for LTE+, even when the UL band for LTE+ is wide and it is difficult for the LTE+ mobile station to perform transmission in the high frequency band of the UL band for LTE+, the LTE+ mobile station can transmit the first and second PUCCH+'s.

ARRANGEMENT EXAMPLE 2

In arrangement example 2, the first PUCCH+ is arranged next to a PUCCH on the lower frequency side of the UL band for LTE and outside the UL band for LTE and the second PUCCH+ is arranged within the UL band for LTE+.

A. ARRANGEMENT EXAMPLE 2(a)

Figure 6A:
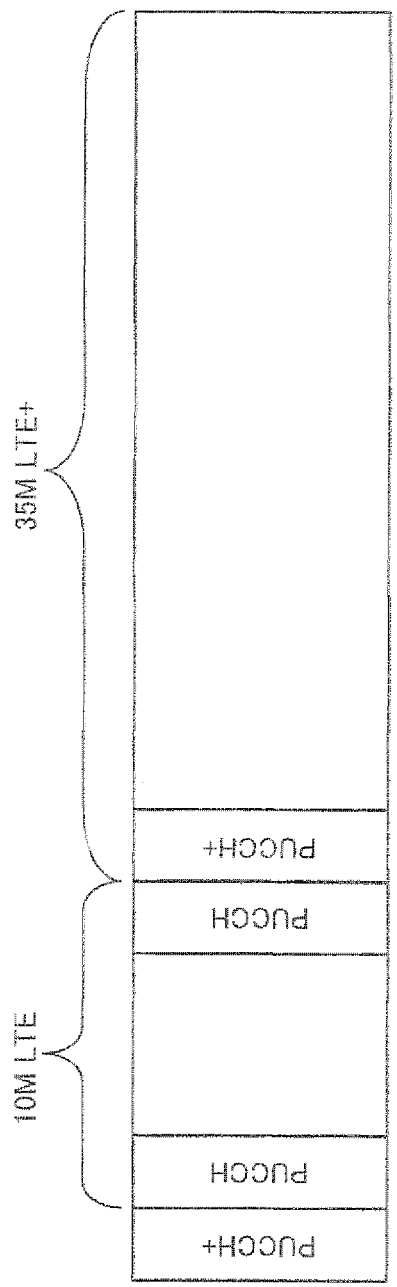
FIG. 6A is a diagram illustrating arrangement example 2(a) of UL band according to Embodiment 2.

FIG. 6A shows arrangement example 2(a).

In arrangement example 2(a), the first PUCCH+ is arranged next to a PUCCH and outside the UL band for LTE. Furthermore, the second PUCCH+ is arranged next to a PUCCH on the higher frequency side and within the UL band for LTE+. In such an arrangement, since the first and second PUCCH+'s are not arranged in the UL band for LTE, it is possible to prevent reduction of the data transmission band in the UL band for LTE compared to arrangement example 1.

B. ARRANGEMENT EXAMPLE 2(b)

Figure 6B:
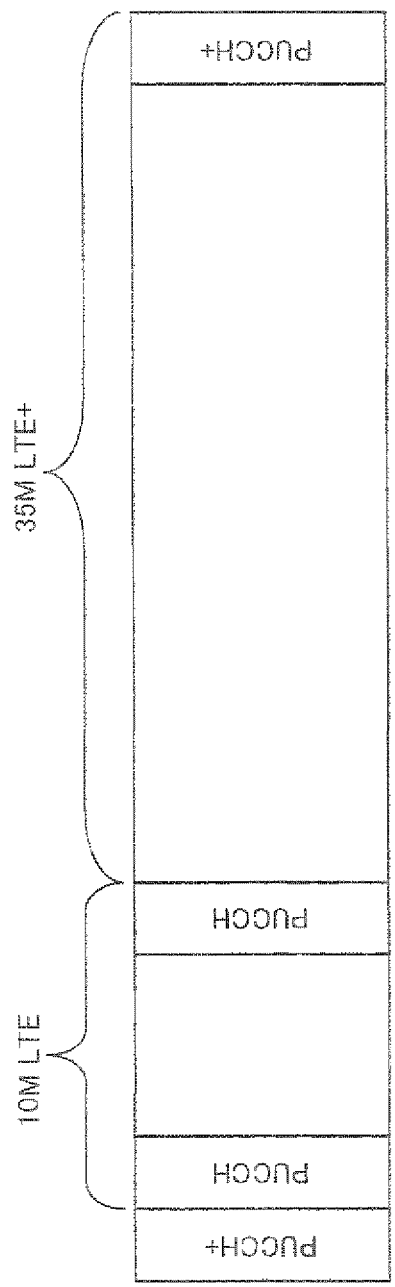
FIG. 6B is a diagram illustrating arrangement example 2(b) of UL band according to Embodiment 2.

FIG. 6B shows arrangement example 2(b).

In arrangement example 2(b), the first PUCCH+ is arranged next to a PUCCH on the lower frequency side and outside the UL band for LTE. Furthermore, the second PUCCH+ is arranged at an end of the higher frequency side within the UL band for LTE+. In such an arrangement, since the first PUCCH+ and the second PUCCH+ are arranged farther from each other than in arrangement example 2(a), a better frequency diversity effect can be provided.

Furthermore, when the LTE+ mobile station operates bands from the band in which the first PUCCH+ is arranged to the band in which the second PUCCH+ is arranged as the UL band for LTE+, the PUCCH+'s are transmitted at both ends of the UL band for LTE+, and therefore bands can be operated with the same rule as that of LTE.

Arrangement example 2 has been described so far. Here, when arrangement example 1 is compared with arrangement example 2, since arrangement example 2 has a greater frequency interval between the first PUCCH+ and the second PUCCH+ than in arrangement example 1, the frequency diversity effect of the PUCCH+'s can be improved.

When the rule of LTE is applied to the rule of LTE+, if the number of PUCCH+'s increases, PUCCH+'s are sequentially arranged inside the UL band for LTE+, and therefore PUCCH+'s may collide with PUCCH's on the lower frequency side in arrangement example 2(a) and arrangement example 2(b). To avoid this collision, PUCCH's need to be arranged in a region where an increment of PUCCH+'s is estimated and the rule of LTE needs to be changed to some extent.

ARRANGEMENT EXAMPLE 3

In arrangement example 3, one of the first and second PUCCH+'s is arranged within the UL band for LTE. That is, one of the first and second PUCCH+'s is nested between two PUCCH's. Thus, in arrangement example 3, the number of PUCCH+'s that occupy the UL band for LTE can be reduced compared to arrangement example 1. FIG. 7A, FIG. 7B, FIG. 7C and FIG. 7D show arrangement example 3(a), arrangement example 3(b), arrangement example 3(c) and arrangement example 3(d), respectively.

A. ARRANGEMENT EXAMPLE 3(a)

Figure 7A:
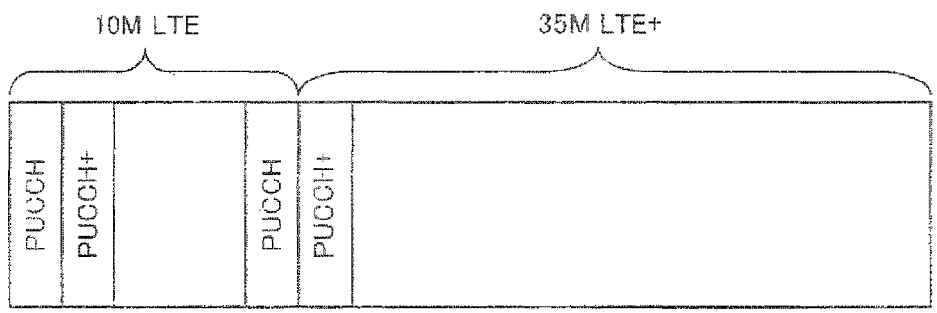
FIG. 7A is a diagram illustrating arrangement example 3(a) of UL band according to Embodiment 2.

FIG. 7A shows arrangement example 3(a).

In arrangement example 3(a), the first and second PUCCH+'s are arranged next to the higher frequency side of two PUCCH's. Such an arrangement eliminates the necessity of transmitting PUCCH+'s outside the band on the lower frequency side of the UL band for LTE and can provide a better frequency diversity effect than arrangement example 1.

B. ARRANGEMENT EXAMPLE 3(b)

Figure 7B:
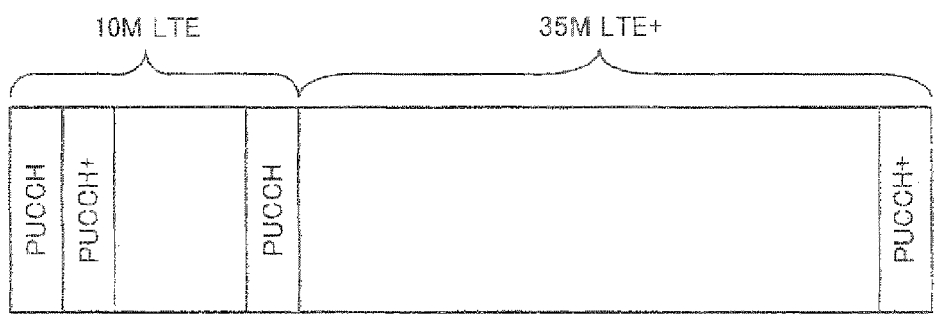
FIG. 7B is a diagram illustrating arrangement example 3(b) of UL band according to Embodiment 2.

FIG. 7B shows arrangement example 3(b).

In arrangement example 3(b), the first PUCCH+ is arranged next to the higher frequency side of a PUCCH on the lower frequency side and the second PUCCH+ is arranged at an end on the higher frequency side of the UL band for LTE+. Compared to arrangement example 3(a), since the frequency interval between two PUCCH+'s is further widened, a better frequency diversity effect can be provided.

C. ARRANGEMENT EXAMPLE 3(c)

Figure 7C:
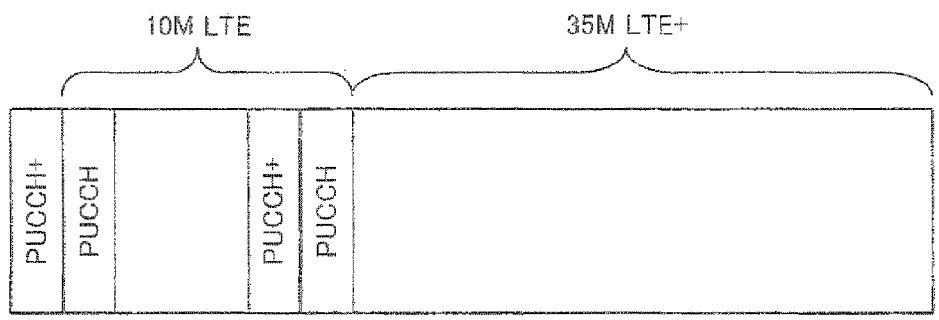
FIG. 7C is a diagram illustrating arrangement example 3(c) of UL band according to Embodiment 2.

FIG. 7C shows arrangement example 3(c).

In arrangement example 3(c), the first and second PUCCH+'s are arranged next to the lower frequency side of two PUCCH's respectively. Such an arrangement can continuously secure a wide band as the UL band for LTE+ in the same way as arrangement example 1 and provide a better frequency diversity effect than arrangement example 1. However, the PUCCH+'s need to be transmitted outside the UL band for LTE in the same way as in arrangement example 2.

D. ARRANGEMENT EXAMPLE 3(d)

Figure 7D:
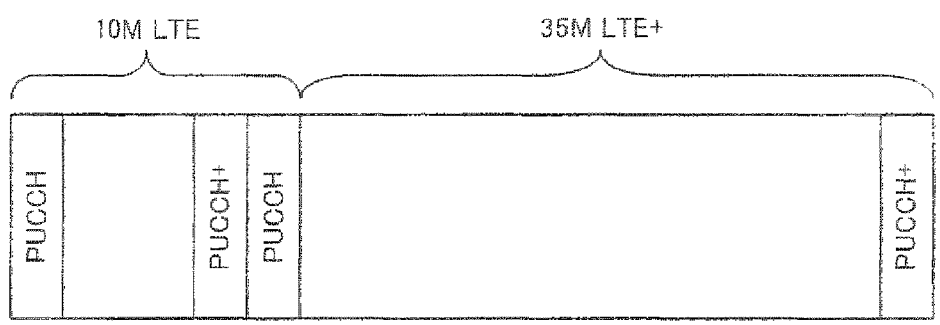
FIG. 7D is a diagram illustrating arrangement example 3(d) of UL band according to Embodiment 2.

FIG. 7D shows arrangement example 3(d).

In arrangement example 3(d), the first PUCCH+ is arranged next to the lower frequency side of a PUCCH on the higher frequency side and the second PUCCH+ is arranged at an end on the higher frequency side of the UL band for LTE+. Compared to arrangement example 3(c), the frequency interval between two PUCCH+'s is widened and therefore a high frequency diversity effect can be provided.

Arrangement example 1 to arrangement example 3 have been described so far. Hereinafter, the configuration of the mobile station apparatus where PUCCH+'s are arranged will be described according to the above described arrangement example.

[Configuration of Mobile Station]

Figure 8:
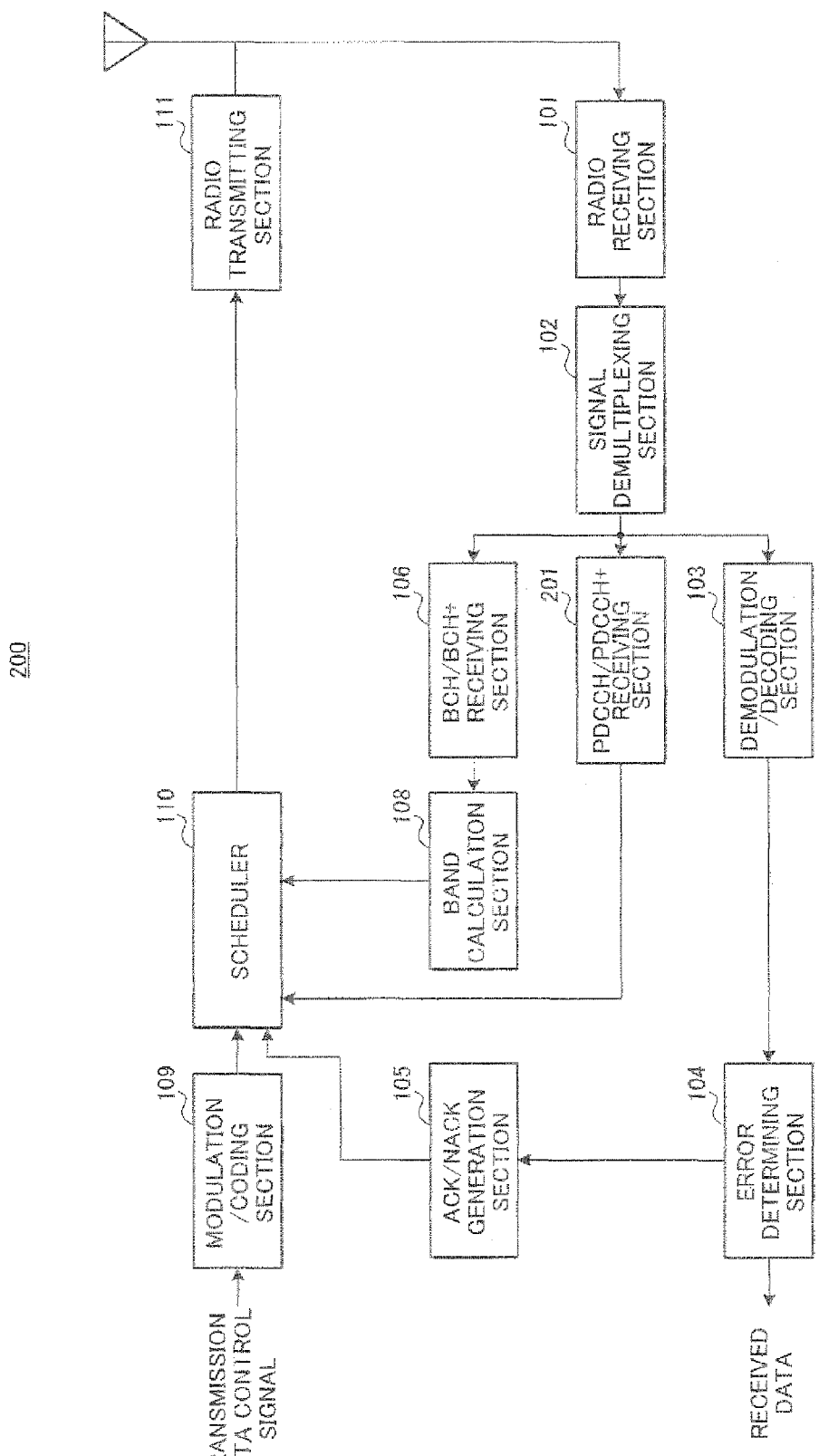
FIG. 8 is a block diagram illustrating a configuration of a mobile station apparatus according to Embodiment 2.

FIG. 8 is a block diagram illustrating a configuration of main parts of the mobile station apparatus according to the present embodiment. Components of mobile station apparatus 200 in FIG. 8 common to those in FIG. 4 will be assigned the same reference numerals as those in FIG. 4 and descriptions thereof will be omitted. Mobile station apparatus 200 in FIG. 8 corresponds to mobile station apparatus 100 in FIG. 4 provided with PDCCH/PDCCH+ receiving section 201 instead of PDCCH/PDCCH+ receiving section 107.

PDCCH/PDCCH+ receiving section 201 receives a PDCCH or PDCCH+. PDCCH/PDCCH+ receiving section 201 determines the transmission position of ACK/NACK in a PUCCH associated with the CCE number of the received PDCCH and outputs information about the determined transmission position to scheduler 110. Furthermore, PDCCH/PDCCH+ receiving section 201 determines the transmission position of ACK/NACK in the PUCCH+ associated with the CCE+ number of the received PDCCH+ and outputs information about the determined transmission position to scheduler 110. The association between the PDCCH+ and the PUCCH+ follows one of arrangement example 1 to arrangement example 3.

As described above, the present embodiment has proposed arrangement example 1 to arrangement example 3 as a new rule of association between a PDCCH+ and a PUCCH+.

Arrangement example 1 to arrangement example 3 can secure transmission data bands in the UL band for LTE+ continuously, and can thereby reduce PAPR when carrying out single carrier transmission.

When the number of PUCCH+'s increases, as the method of arranging PUCCH+'s corresponding to the increment, PUCCH+'s may be arranged next to the already arranged PUCCH+'s and inside or outside the PUCCH+'s. Furthermore, as the method of arranging PUCCH+'s corresponding to the increment, a combination of aforementioned arrangement example 1 to arrangement example 3 may be used.

Furthermore, a case has been described above where information about the UL band for LTE+ is reported using a BCH+ as an example, but the information may also be reported using control information other than a BCH+.

A case has been described above where a BCH+ is arranged in the DL band for LTE+ as an example, but without being limited to this, a BCH+ may also be arranged in the DL band for LTE.

Furthermore, the LTE+ mobile station may also be communicated only in the UL band for LTE+ or may be communicated only in the UL band for LTE or may be communicated using the UL band for LTE+ and the UL band for LTE together.

Moreover, although cases have been described with the embodiments above where the present invention is configured by hardware, the present invention may be implemented by software.

Each function block employed in the description of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an. LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No.2008-204327, filed on Aug. 7, 2008, including the specification, drawings and abstract, is incorporated herein by reference in its entirety.

Industrial Applicability

The frequency band allocation method and transmitting apparatus according to the present invention is useful as an uplink frequency band allocation method for an LTE system and LTE+ system in a mixed system in which the LTE system and LTE+ system coexist and as a transmitting apparatus applied to a mixed system or the like.

Reference Signs List 100,200 Mobile station apparatus
101 Radio receiving section
102 Signal demultiplexing section
103 Demodulation/decoding section
104 Error determining section
105 ACK/NACK generation section
106 BCH/BCH+ receiving section
107,201 PDCCH/PDCCH+ receiving section 108 Band calculation section
109 Modulation/coding section
110 Scheduler
111 Radio transmitting section

The invention claimed is:

1. A frequency band allocation method in a mixed system in which a first communication system and a second communication system coexist, wherein, in the first communication system, terminals performing single carrier transmission on an uplink are mixed and the second communication system uses an uplink whose maximum bandwidth is narrower than the maximum bandwidth of the uplink of the first communication system, the method comprising:
   allocating a continuous first frequency band, to which a single carrier signal of the first communication system is allocated, to the uplink of the first communication system, and
   allocating a second frequency band to the uplink of the second communication system, the second frequency band being positioned lower than the first frequency band and adjacent to the first frequency band, thereby not overlapping with the first frequency band,
   wherein the first communication system is compatible with the second communication system,
   wherein the allocating further comprises:
   reporting a total bandwidth of a first bandwidth of the uplink of the first communication system and a second bandwidth of the uplink of the second communication system, a first center frequency of the uplink of the second communication system, and the second bandwidth, to one of the terminals of the first communication system, and
   wherein at the one of the terminals of the first communication system, a second center frequency of the uplink of the first communication system is acquired using the reported total bandwidth, the reported first center frequency, and the reported second bandwidth.

2. The frequency band allocation method according to claim 1, wherein the first communication system is LTE+ and the second communication system is LTE.

3. The frequency band allocation method according to claim 2, wherein the first and second PUCCH+'s for LTE+ are arranged next to a PUCCH for LTE and within the band for LTE.

4. The frequency band allocation method according to claim 2, wherein:
   the first PUCCH+ for LTE+ is arranged next to a PUCCH for LTE on the lower frequency side and outside the band for LTE; and
   the second PUCCH+ for LTE+ is arranged next to a PUCCH for LTE on the higher frequency side and outside the band for LTE.

5. The frequency band allocation method according to claim 2, wherein:
   the first PUCCH+ for LTE+ is arranged next to a PUCCH for LTE on the lower frequency side and outside the band for LTE; and
   the second PUCCH+ for LTE+ is arranged in the band for LTE+ on the higher frequency side.

6. The frequency band allocation method according to claim 2, wherein:
   the first PUCCH+ for LTE+ is arranged next to a PUCCH for LTE on the lower frequency side and inside the band for LTE; and
   the second PUCCH+ for LTE+ is arranged next to a PUCCH for LTE on the higher frequency side and outside the band for LTE.

7. The frequency band allocation method according to claim 2, wherein:
   the first PUCCH+ for LTE+ is arranged next to a PUCCH for LTE on the lower frequency side and inside the band for LTE; and
   the second PUCCH+ for LTE+ is arranged in the band for LTE+ on the higher frequency side.

8. The frequency band allocation method according to claim 2, wherein:
   the first PUCCH+ for LTE+ is arranged next to a PUCCH for LTE on the lower frequency side and outside the band for LTE; and
   the second PUCCH+ for LTE+ is arranged next to a PUCCH for LTE on the higher frequency side and inside the band for LTE.

9. The frequency band allocation method according to claim 2, wherein:
   the first PUCCH+ for LTE+ is arranged next to a PUCCH for LTE on the higher frequency side and inside the band for LTE; and
   the second PUCCH+ for LTE+ is arranged in the band for LTE+on the higher frequency side.

10. A transmitting apparatus in a mixed system in which a first communication system and a second communication system coexist, wherein, in the first communication system, terminals performing single carrier transmission on an uplink are mixed and the second communication system uses an uplink whose maximum bandwidth is narrower than the maximum bandwidth of the uplink of the first communication system, the transmitting apparatus comprising:
   an acquiring section that acquires information of a continuous first frequency band, to which a single carrier signal of the uplink of the first communication system is allocated; and
   a transmission section that carries out single carrier transmission in the first frequency band, wherein
   the uplink of the second communication system has a second frequency band allocated thereto via reporting by another apparatus a total bandwidth of a first bandwidth of the uplink of the first communication system and a second bandwidth of the uplink of the second communication system, a first center frequency of the uplink of the second communication system, and the second bandwidth, to one of the terminals of the first communication system, the second frequency band being positioned lower than the first frequency band and adjacent to the first frequency band, thereby not overlapping with the first frequency band, and
   the transmitting apparatus communicates with the one of the terminals which acquires a second center frequency of the uplink of the first communication system using the reported total bandwidth, the reported first center frequency, and the reported second bandwidth.

* * * * *